United States Patent
Kim et al.

(10) Patent No.: US 10,075,517 B2
(45) Date of Patent: Sep. 11, 2018

(54) DISPLAY APPARATUS AND CONTROL METHOD THEREOF

(71) Applicant: Samsung Electronics Co., Ltd., Suwon-si (KR)

(72) Inventors: Ki-hun Kim, Suwon-si (KR); Kyeong-chae Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/331,124

(22) Filed: Oct. 21, 2016

(65) Prior Publication Data

US 2017/0118276 A1    Apr. 27, 2017

(30) Foreign Application Priority Data

Oct. 22, 2015  (KR) .................. 10-2015-0147422

(51) Int. Cl.
| | |
|---|---|
| *H04M 3/00* | (2006.01) |
| *H04L 29/08* | (2006.01) |
| *H04W 8/00* | (2009.01) |
| *H04W 72/06* | (2009.01) |

(52) U.S. Cl.
CPC .......... *H04L 67/104* (2013.01); *H04W 8/005* (2013.01); *H04W 72/06* (2013.01)

(58) Field of Classification Search
CPC ...... H04W 8/005; H04W 72/06; H04L 67/104
USPC ........................................................ 455/419
See application file for complete search history.

(56) References Cited

U.S. PATENT DOCUMENTS

| | | | |
|---|---|---|---|
| 8,432,786 B2 | 4/2013 | Li et al. | |
| 8,914,487 B2 | 12/2014 | Li et al. | |
| 2010/0128701 A1 | 5/2010 | Nagaraja | |
| 2011/0078312 A1 | 3/2011 | Rimac et al. | |
| 2011/0249631 A1* | 10/2011 | Li | H04W 72/04 370/329 |
| 2013/0034023 A1* | 2/2013 | Jung | H04L 67/104 370/255 |
| 2013/0265907 A1* | 10/2013 | Kim | H04W 88/06 370/254 |

(Continued)

FOREIGN PATENT DOCUMENTS

| | | |
|---|---|---|
| KR | 10-2009-0097034 | 9/2009 |
| KR | 10-2014-0051264 | 4/2014 |

OTHER PUBLICATIONS

WiFi_P2P_Technical_Specification_v1.2, 2010.*

*Primary Examiner* — William Nealon
(74) *Attorney, Agent, or Firm* — Staas & Halsey LLP

(57) ABSTRACT

An electronic apparatus for supporting wireless peer to peer (P2P) communication with an external apparatus is provided, that includes a communicator configured to transmit and receive a signal for performing discovery and group formation, and a controller configured to transmit a first preferred channel list including a channel number indicating at least one channel pre-established among a plurality of channels available as an operating channel, to the external apparatus, to select one channel number from at least one channel number included in a second preferred channel list and the channel number included in the first preferred channel list in response to the second preferred channel list being received from the external apparatus as an operating channel with the external apparatus.

18 Claims, 8 Drawing Sheets

(56) References Cited

U.S. PATENT DOCUMENTS

2014/0140296 A1    5/2014  Choi et al.
2016/0021586 A1*  1/2016  Akhi ................... H04W 36/06
                                                        370/229

* cited by examiner

DISPLAY APPARATUS AND CONTROL METHOD THEREOF

CROSS-REFERENCE TO RELATED APPLICATIONS

This application claims priority from Korean Patent Application No. 10-2015-0147422, filed on Oct. 22, 2015 in the Korean Intellectual Property Office, the disclosure of which is incorporated herein by reference in its entirety.

BACKGROUND

1. Field

Apparatuses and methods consistent with the present disclosure relate to an electronic apparatus for supporting wireless peer to peer (P2P) communication with an external apparatus and a communication method of the electronic apparatus, and more particularly, to an electronic apparatus for selecting a channel for P2P communication between two electronic apparatuses and a communication method of the electronic apparatus.

2. Description of the Related Art

Wi-Fi peer to peer (P2P) is a wireless communication technology for developing a wireless LAN technology of IEEE 802.11 standard to direct communication between two devices and the service name is called Wi-Fi Direct™.

In order to perform communication using Wi-Fi Direct, a group between P2P devices needs to be formed. In order to form the group, the two P2P devices perform a GO negotiation procedure for determining a group owner (GO) that will function as an AP.

During the GO negotiation procedure for Wi-Fi Direct, the two devices may also exchange an operating channel value along with an intent value for determination of a group owner.

Conventionally, a channel of a WiFi set for direct communication between two P2P devices is unilaterally determined by the determined GO. In detail, the set channel between two devices in Wi-Fi Direct is determined according to an operating channel value of a GO negotiation frame transmitted by the group owner.

In addition, the operating channel value is only one and a channel number transmitted from a device as a client is disregarded.

There is a problem in that P2P communication via such conventional Wi-Fi Direct does not consider device performance, a channel required for a function to be performed via P2P communication, or suitability of a system environment during channel selection such as channel interference.

SUMMARY

Additional aspects and/or advantages will be set forth in part in the description which follows and, in part, will be apparent from the description, or may be learned by practice of the embodiments.

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

In the exemplary embodiment of the present disclosure, a "module" or a "unit" performs at least one function or operation, and may be implemented with hardware, software, or a combination of hardware and software. In addition, a plurality of "modules" or a plurality of "units" may be integrated into at least one module except for a "module" or a "unit" which has to be implemented with specific hardware, and may be implemented with at least one processor (not shown).

The present disclosure provides a device and communication method for selecting a channel for more suitable P2P communication by indicating a preferred channel.

According to an aspect of the present disclosure, an electronic apparatus for supporting wireless peer to peer (P2P) communication with an external apparatus includes a communicator configured to transmit and receive a signal for performing discovery and group formation, and a controller configured to transmit a first preferred channel list including a channel number indicating at least one channel pre-established among a plurality of channels available as an operating channel, to the external apparatus, to select one channel number from at least one channel number included in a second preferred channel list and the channel number included in the first preferred channel list in response to the second preferred channel list being received from the external apparatus, and to establish a channel of the selected channel number as an operating channel with the external apparatus.

The controller may transmit the first preferred channel list in a transmitted probe request frame to the external apparatus in a search state of a discovery phase.

The controller transmits the first preferred channel list in a transmitted group owner (GO) negotiation request frame to the external apparatus in a group formation phase.

A plurality of channels may be pre-established, and the controller may assign priority sequences to the channel numbers according to communication quality of the established channels, transmit the first preferred channel list to which the priority sequences are assigned, to the external apparatus, and select a channel of a common channel number with first priority from the at least one channel number included in the received second preferred channel list and the channel numbers included in the first preferred channel list.

A plurality of channels may be pre-established, and the controller may transmit a preferred channel list formed by assigning weights to channel numbers of the plurality of established channels to the external apparatus according to communication quality of the plurality of established channels and whether a specific channel is required to execute a function of the electronic apparatus, and select a channel with a maximum weight based on a weight of the electronic apparatus, assigned to each channel number, and a weight of the external apparatus among the at least one channel number included in the received second preferred channel list and the channel numbers included in the first preferred channel list.

The weight may included a number indicating that connection with a specific channel is mandatory, and the controller may select a channel to which the mandatory number is assigned when the mandatory number is present in the received second preferred channel list.

The controller may fail in group formation with the external apparatus when connection with a channel to which the mandatory number is assigned is not capable of being established.

When the electronic apparatus has concurrency for setting only a single channel and needs to maintain a single channel pre-established with a function to be executed for communication with the external apparatus, the controller may assign the mandatory number to a channel number indicating the established single channel.

The controller may assign a priority sequence to the channel number based on whether a corresponding channel is a channel established with an AP or the number of other external apparatuses using the corresponding channel.

The controller may transmit the preferred channel list further including reason information indicating reason for assigning the weight to the plurality of channel numbers, to the external apparatus, and select the single channel number with reference to reason information included in the received second preferred channel list.

According to another aspect of the present disclosure, a communication method of an electronic apparatus for supporting wireless peer to peer (P2P) communication with an external apparatus includes transmitting a first preferred channel list including a preferred channel number indicating at least one channel pre-established among a plurality of channels available as an operating channel, to the external apparatus, in response to a second preferred channel list being received from the external apparatus, selecting one channel number from at least one channel number included in the received second preferred channel list and the channel number included in the first preferred channel list, and establishing a channel of the selected channel number as an operating channel with the external apparatus.

The transmitting may include transmitting the first preferred channel list in a transmitted probe request frame to the external apparatus in a search state of a discovery phase.

The transmitting may include transmitting the first preferred channel list in a transmitted group owner (GO) negotiation request frame to the external apparatus in a group formation phase.

A plurality of channels may be pre-established, the transmitting may include assigning priority sequences to the channel numbers according to communication quality of the established channels and transmitting the first preferred channel list to which the priority sequences are assigned, to the external apparatus, and the selecting may include selecting a channel of a common channel number with first priority from the at least one channel number included in the received second preferred channel list and the channel numbers included in the first preferred channel list.

A plurality of channels may be pre-established, the transmitting may include transmitting a preferred channel list formed by assigning weights to channel numbers of the plurality of established channels to the external apparatus according to communication quality of the plurality of established channels and whether a specific channel is required to execute a function of the electronic apparatus, and the selecting may include selecting a channel with a maximum weight based on a weight of the electronic apparatus, assigned to each channel number, and a weight of the external apparatus among the at least one channel number included in the received second preferred channel list and the channel numbers included in the first preferred channel list.

The weight may include a number indicating that connection with a specific channel is mandatory, and the selecting may include selecting a channel to which the mandatory number is assigned when the mandatory number is present in the received second preferred channel list.

The establishing may include failing in group formation with the external apparatus when connection with a channel to which the mandatory number is assigned is not capable of being established.

When the electronic apparatus has concurrency for setting only a single channel and needs to maintain a single channel pre-established with a function to be executed for communication with the external apparatus, the mandatory number may be assigned to a channel number indicating the established single channel.

The priority sequence may be assigned to the channel number based on whether a corresponding channel is a channel established with an AP or the number of other external apparatuses using the corresponding channel.

The transmitting may include transmitting the preferred channel list further including reason information indicating reason for assigning the weight to the plurality of channel numbers, to the external apparatus, and the selecting may include selecting the single channel number with reference to reason information included in the received second preferred channel list.

According to the diverse exemplary embodiments of the present disclosure, the electronic apparatus and a communication method thereof may have the following advantages.

An electronic apparatus according to an exemplary embodiment of the present disclosure, a pre-established channel may be used to prevent delay time due to establishment of a new channel. In addition, the electronic apparatus may reduce computational load for management and conversion of a channel.

According to another exemplary embodiment of the present disclosure, an electronic apparatus may ensure flexibility for channel selection.

According to another exemplary embodiment of the present disclosure, an electronic apparatus may signal operating channel information extended from existing signaling without additional handshake.

According to another exemplary embodiment of the present disclosure, an electronic apparatus may force even a counterpart electronic apparatus that is not a group owner to use a channel to be established and prevent other channels from being unnecessarily established.

According to another exemplary embodiment of the present disclosure, an electronic apparatus may appropriately establish a channel according to the performance and communication state of the electronic apparatus.

According to another exemplary embodiment of the present disclosure, the method may be stored on a non-transitory computer readable storage medium.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1A:
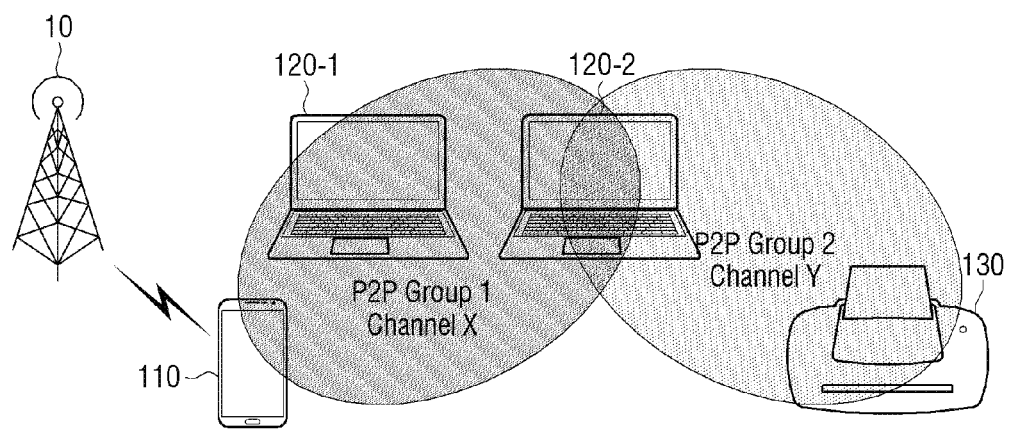
FIGS. 1A and 1B are diagrams illustrating a topology for explanation of an example of WiFi Direct.

Reference will now be made in detail to the embodiments, examples of which are illustrated in the accompanying drawings, wherein like reference numerals refer to the like elements throughout. The embodiments are described below to explain the present invention by referring to the figures.

Certain exemplary embodiments of the present disclosure will now be described in greater detail with reference to the accompanying drawings. Further, in the following description of the embodiments of the present disclosure, a detailed description of known functions and configurations incorporated herein will be omitted for the purpose of clarity and for brevity.

Figure 1B:
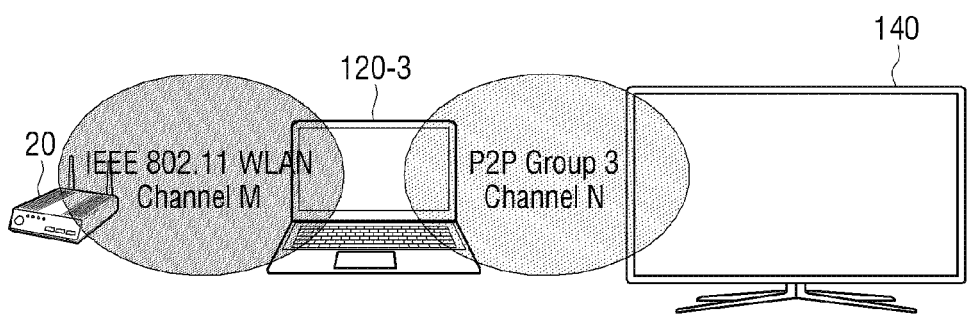

FIGS. 1A and 1B are diagrams illustrating a topology for explanation of an example of WiFi Direct.

In FIGS. 1A and 1B, a plurality of devices may be connected to communicate with each other.

Referring to FIG. 1A, a mobile phone 110, a first laptop 120-1 and a second laptop 120-2 may form a peer to peer (P2P) Group 1 and perform WiFi P2P communication through Channel X. The second laptop 120-2 and a printer 130 may form a P2P Group 2 and perform WiFi P2P communication through Channel Y.

In a wireless communication system of FIG. 1A, the mobile phone 110 may be set with communication of other mobile communication standards such as CDMA, 3G, and 4G with a base station 10 and may also be set with radio communication of WiFi Direct as a group owner (GO) of Group 1.

The first laptop 120-1 may be a legacy client and may recognize the mobile phone 110 as a GO of Group 1 along with an AP and perform P2P communication.

The second laptop 120-2 may be a client of Group 1 and may also be a GO of Group 2. The second laptop 120-2 may communicate with the printer 130 for supporting WiFi Direct through Channel Y.

Referring to FIG. 1B, a wireless hub 20 as a legacy device may form a WLAN according to WiFi standard and a laptop 120-3 may access the wireless hub 20 as an AP through Channel M. In addition, the laptop 120-3 may form a P2P group 3 along with a digital TV 140 and perform WiFi P2P communication through Channel N.

The wireless hub 20 may be an AP of a wireless LAN (WLAN or WiFi). The wireless hub 20 may be connected to the Internet through a wired cable.

The laptop 120-3 may be a client device that accesses the wireless hub 20 as an AP and may perform P2P communication using WiFi Direct with the digital TV 140 as a client as a GO of P2P group 3.

As described above, WiFI Direct may be a method extended from the conventional WiFi standard and may be compatible with a conventional legacy device. Due to presence of devices connected to a mobile communication network, a wired network, or other networks such as other P2P groups, an area in which other P2P devices communicate may be extended.

Figure 2:
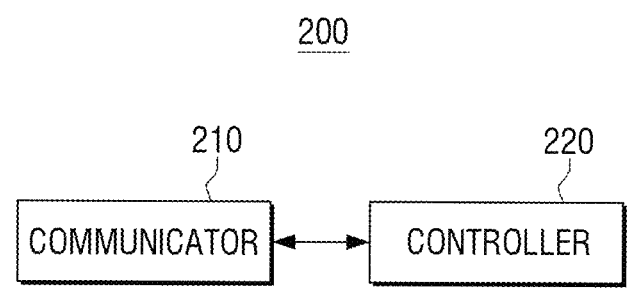
FIG. 2 is a block diagram for explanation of a schematic configuration of an electronic apparatus according to an exemplary embodiment of the present disclosure.

FIG. 2 is a block diagram for explanation of a schematic configuration of an electronic apparatus 200 according to an exemplary embodiment of the present disclosure.

Referring to FIG. 2, the electronic apparatus 200 may include a communicator 210 and a controller 220.

The communicator 210 may transmit and receive signals for radio P2P communication. Here, radio P2P communication may be WiFi Direct and the signals for radio P2P communication may be signals for WiFi Direct. In detail, the communicator 210 may transmit and receive signals for performing discovery and group formation. Hereinafter, the case in which radio P2P communication is WiFi Direct. However, the case in which radio P2P communication is WiFi Direct may be merely an example and, needless to say, various radio P2P communication methods may be applied.

The communicator 210 may include an antenna (not shown) for receiving and transmitting a radio frequency in the air. A plurality of antennas may be used to embody a MIMO system of the electronic apparatus 200.

The communicator 210 may include a wireless communication module for at least WiFi Direct. According to another exemplary embodiment of the present disclosure, the communicator 210 may further include a broadcast receiving module for receiving a broadcast signal through a broadcast channel such as a satellite channel and a terrestrial channel. According to another exemplary embodiment of the present disclosure, the communicator 210 may further include a mobile communication module for transmitting and receiving a radio signal with a base station. According to another exemplary embodiment of the present disclosure, the communicator 210 may further include a local-area communication module for supporting at least one of Bluetooth, RFID, InDA, UWB, and ZigBee.

The controller 220 may control each component of the electronic apparatus 200. In detail, the controller 220 may control each component of the electronic apparatus 200 for Wi-Fi Direct communication with a counterpart electronic device, that is, an external apparatus.

The controller 220 may transmit a list of preferred channels including a channel number indicating at least one pre-established channel among a plurality of channels available as an operating channel to an external apparatus. In detail, the controller 220 may transmit the preferred channel list including at least one channel number that is pre-established in another electronic device to a discovered external apparatus.

Here, the operating channel may refer to a channel in which two electronic devices perform data communication in an operation phase using Wi-Fi Direct. According to the standard, WiFi uses both a band of 2.4 GHz and a band of 5 GHz and 802.11 b/g/n uses 14 channels of 2.4 Ghz. Thereamong, a channel number, use of which is limited for each country, is present. For example, in the case of the US, use of Channel #12 (center frequency, 2.467 MHz) and Channels #13 and #14 are limited. Accordingly, a number of a channel available as an operating channel may be 1 to 12.

The electronic apparatus 200 may be preset with a communication channel with another electronic apparatus according to WiFi prior to initiation of access to an external apparatus. Referring to the example of FIGS. 1A and 1B, the case in which the second laptop 120-2 is set with Channel Y with the printer 130 prior to formation of Group 1 with the mobile phone 110 may be considered. In addition, the case in which the third laptop 120-3 is set with Channel M with the wireless hub 20 prior to formation of Group 3 with the digital TV 140 may be considered.

Like the electronic apparatus 200 transmits the preferred channel list to an external apparatus, the electronic apparatus 200 may receive a counterpart preferred channel list of the external apparatus. In detail, the communicator 210 may receive the counterpart preferred channel list. Here, a channel number included in the counterpart preferred channel list may be a channel that is pre-established in an external apparatus.

When there is no channel established by the electronic apparatus 200 or an external apparatus, the preferred channel list may include an arbitrary channel number or include 0 which means that there is no established channel. Alternatively, when there is no established channel, the electronic apparatus 200 may not transmit the preferred channel list.

In response to the preferred channel list being received from an external apparatus, the controller 220 may select one channel number among at least one channel number included in the received counterpart preferred channel list and channel numbers included in the preferred channel list of the controller 220. The controller 220 may establish an operating channel with an external apparatus as a channel of the selected channel number.

In detail, the controller 220 may select one channel number for setting a channel among all preferred channel numbers including preferred channel number of a counterpart apparatus along with a preferred channel number of the controller 220.

The controller 220 may set a channel in various methods. According to an exemplary embodiment of the present disclosure, the controller 220 may select one of channel numbers that are the same as a channel number of included in the preferred channel list of the controller 220 among channel number included in the received counterpart preferred channel list.

The electronic apparatus 200 may establish a plurality of channels and, in this case, the controller 220 may transmit the preferred channel list including a plurality of channel numbers indicating established channels to an external apparatus.

Here, the controller 220 may assign priority sequences to the plurality of channel numbers, respectively. In detail, the controller 220 may assign priority sequences indicating sequences of preference for channel selection to the plurality of channels. In addition, the controller 220 may transmit the preferred channel list to which priority sequences are applied to an external apparatus.

The preferred channel list to which priority sequences are applied may be written in various ways. For example, the preferred channel list may include channel numbers that are sequentially listed according to priority sequences. As another example, the preferred channel list may include channel numbers and numbers indicating priority sequences corresponding to the respective channel numbers.

In response to the counterpart preferred channel list being received from an external apparatus, the controller 220 may select a channel number in consideration of priority sequences. In detail, the controller 220 may select a channel number with first priority when there are a plurality of channel numbers that are common to the two preferred channel lists of the electronic apparatus 200 and an external apparatus.

A channel number with first priority may be determined among the common channel numbers based on priority sequences assigned by an electronic apparatus of a group owner, priority sequences assigned by an electronic apparatus of a client, or higher priority of two priority sequences that are assigned to the common channel number by the both sides.

According to another exemplary embodiment of the present disclosure, the controller 220 may apply weights to a plurality of channel numbers. In detail, the controller 220 may apply weights indicating a preference degree of channel selection to a plurality of channels. The controller 220 may transmit a preferred channel list containing weights to an external apparatus.

Weight refers to a value indicating a preference degree or importance of a channel number. For example, weight may include five grades to 5 from 1. In addition, any one of grades 1 to 5 may be applied to each channel number.

In response to the counterpart preferred channel list being received from an external apparatus, the controller 220 may select a channel number in consideration of a weight. In detail, when there is a plurality of common channel numbers to the two preferred channel lists of the electronic apparatus 200 and an external apparatus, the controller 220 may select a channel number with a maximum weight.

A weight may include a number indicating that connection of a specific channel is mandatory. For example, a weight of grade 5 may indicate that a channel corresponding to a channel number assigned grade 5 needs to be set.

When mandatory numbers are present in the counterpart preferred channel list and the preferred channel list of the controller 220, the controller 220 may select a channel to which a mandatory number is assigned.

The aforementioned priority sequences and weights may be determined according to various standards. According to an exemplary embodiment of the present disclosure, the controller 220 may determine priority sequences or weights according to communication quality.

For example, communication quality may be determined according to the number of peers that use a channel or intensity (mdB) of a signal of a corresponding channel. This is because, when the number of electronic apparatuses that use a corresponding channel is high, that is, when signal intensity in the air of the corresponding channel is high, a multiplexing degree and signal interference are high and, thus, communication performance is lowered.

A channel number of a channel set with an AP may be assigned a high priority sequence or a high weight. In general, an electronic apparatus uses the Internet of an AP via P2P communication with an electronic apparatus connected to the AR In other words, in general, the electronic apparatus connected to the AP functions as a relay between an AP and an external apparatus. In this case, when a channel used for connection with an AP and a channel used for P2P connection with an external apparatus are different, an electronic apparatus needs to perform frequent channel conversion in order to function as a relay of data transmission to an external apparatus from an AP or a relay of data transmission to an AP from an external apparatus. The frequent channel conversion of the communicator 210 may degrade communication performance.

When a pre-established channel needs to be maintained, a mandatory weight may be assigned to the channel number. Low performance of an electronic apparatus may be performance of setting only one channel. That is, in the case of several electronic apparatuses, a communicator may include one wireless communication module and the wireless communication module may have a single channel concurrency (SCC) for setting only a single channel. In this case, a function to be achieved via P2P communication with an external apparatus needs to maintain a pre-established single channel.

With reference to the example of FIG. 1B, the third laptop 120-3 having single channel concurrency needs to disconnect Channel M set with the existing wireless hub 20 in order to establish Channel N with the digital TV 140. However, when a function of the third laptop 120-3, to be achieved via P2P communication with the digital TV 140, is a media stream and reproducing function of outputting multimedia data streamed through the wireless hub 20 to the digital TV 140, connection of Channel M for stream from a source needs to be maintained. Accordingly, according to an exemplary embodiment of the present disclosure, the laptop 120-3 may transmit the preferred channel list obtained by assigning a mandatory weight to a channel number of Channel M to the digital TV 140 and the digital TV 140 may establish connection with the third laptop 120-3 to Channel M assigned a mandatory number irrespective of determination of the laptop 120-3 as a group owner.

When connection with a channel assigned with a mandatory number is not capable of being established, the controller 220 may fail in group formation with an external apparatus. In detail, when connection with an external apparatus to a channel that needs to be mandatorily maintained is not capable of being established, the controller 220 may not form a P2P group of Wi-Fi Direct. According to an exemplary embodiment of the present disclosure, the controller 220 may transmit a signal indicating Fail to an external apparatus through the communicator 210. In this case, the controller 220 may transmit a signal denoted by a value indicating Fail to a state region of a GO negotiation response frame.

As an example of the case in which connection with a channel denoted by a mandatory number is not capable of being established, both electronic apparatuses each have a channel with a mandatory weight and the two mandatory channels do not correspond to each other.

The controller 220 may transmit the preferred channel list including reason information indicating the reason for assigning a priority sequence or a weight to a plurality of channel numbers along with the priority sequence or the weight assigned to the plurality of channel numbers to an external apparatus. The reason information may be a text or appointed code name expressed by a language readable or recognizable by the human being. The reason for assigning the priority sequence or the weight, to be described in the reason information, may be a requirement for execution of a function of an application, communication quality, resource limitation, and so on.

The aforementioned device according to an exemplary embodiment of the present disclosure may set a channel for P2P communication selected in consideration of a communication system environment and electronic apparatus capability.

Figure 3:
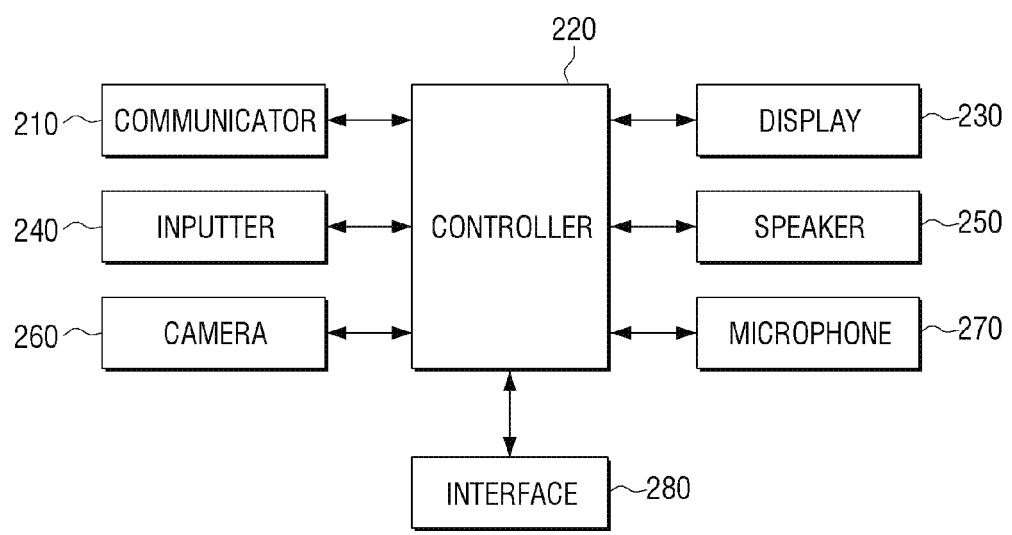
FIG. 3 is a block diagram for explanation of detailed components of the electronic apparatus of FIG. 2.

FIG. 3 is a block diagram for explanation of detailed components of the electronic apparatus 200 of FIG. 2.

Referring to FIG. 3, the electronic apparatus 200 may include the communicator 210, the controller 220, a display 230, an inputter 240, a speaker 250, a camera 260, a microphone 270, and an interface 280.

The communicator 210 may transmit and receive a signal for Wi-Fi Direct. In detail, the communicator 210 may transmit and receive a signal for performing discovery and group formation.

The communicator 210 may include a modulator/demodulator, an equalizer, an encoder, a decoder, and so on, for complying with protocols of a MAC layer and a PHY layer according to communication standard of Wi-Fi Direct.

Other components and functions of the communicator 210 are the same as those of the communicator 210 of FIG. 2 and, thus, a repeated description will be omitted here.

The controller 220 may be embodied as a mobile processor and may include a read only memory (ROM) for storing a control program, and a random access memory (RAM) for storing input and output signals, and an application program of data record and execution. A processor may include a single core or a multi core. The processor, the ROM, and the RAM may be installed on a hardware substrate and connected to each other through a bus.

Other components and functions of the controller 220 are the same as those of the controller 220 of FIG. 2 and, thus, a repeated description will be omitted here.

The display 230 may display an image. In detail, the display 230 may display an image including information for Wi-Fi Direct. For example, in response to a plurality of electronic apparatuses being discovered, the display 230 may display the plurality of discovered electronic apparatuses. In addition, during a procedure of forming a P2P group with an electronic apparatus that is selected by a user among the plurality of discovered electronic apparatuses, the display 230 may display a channel number of a channel to be established for P2P communication. In this case, the displayed channel number may be a channel number included in a preferred channel list received from an external apparatus. Along with a channel number, the display 230 may also display at least one of a priority number or a weight assigned to a corresponding channel number, a channel user number, and signal intensity for each channel.

The display 230 may display a UI for receiving required authentication information from a user during an authentication procedure for security.

The display 230 may be embodied as at least one of an LCD, an OLED, a flexible display, and a three-dimensional (3D) display.

The inputter 240 may receive user manipulation for the electronic apparatus 200. The inputter 240 may be embodied as a touch sensor for detection of a user on the display 230. According to another exemplary embodiment of the present disclosure, the inputter 240 may be embodied as an input device such as a mouse and a keyboard.

The speaker 250 may output a received broadcast signal, a call signal, call voice, or stored audio data as sound.

The camera 260 may photograph an object and generate image data of the photographed object. The image data generated by the camera 260 may be transmitted to an external apparatus through the communicator 210 according to control of the controller 220.

The microphone 270 may detect vibration of outside air to generate electric sound data. Call voice data generated by the microphone 270 may be transmitted to the base station 10 and other generated sound data may be transmitted to an external apparatus through the communicator 210 according to control of the controller 220.

The interface 280 may perform a function of data transmission and reception between the electronic apparatus 200 and an external apparatus or a function of receiving power supply. The interface 280 may include at least one data port, a power supply port, and an audio/video port.

Components of the electronic apparatus 200 are not limited to the aforementioned components of the above block diagram and various components may be added or omitted according to objective and use of the electronic apparatus 200. For example, the printer 130 may further include a paper feeder, an ink cartridge, a paper discharger, and so on. The printer 130 may exclude the speaker 250, the camera 260, and the microphone 270, which are not necessary.

Hereinafter, with reference to an example of FIG. 4, a procedure of initiating data communication using a Wi-Fi Direct method by the aforementioned electronic apparatus 200 will be described.

Figure 4:
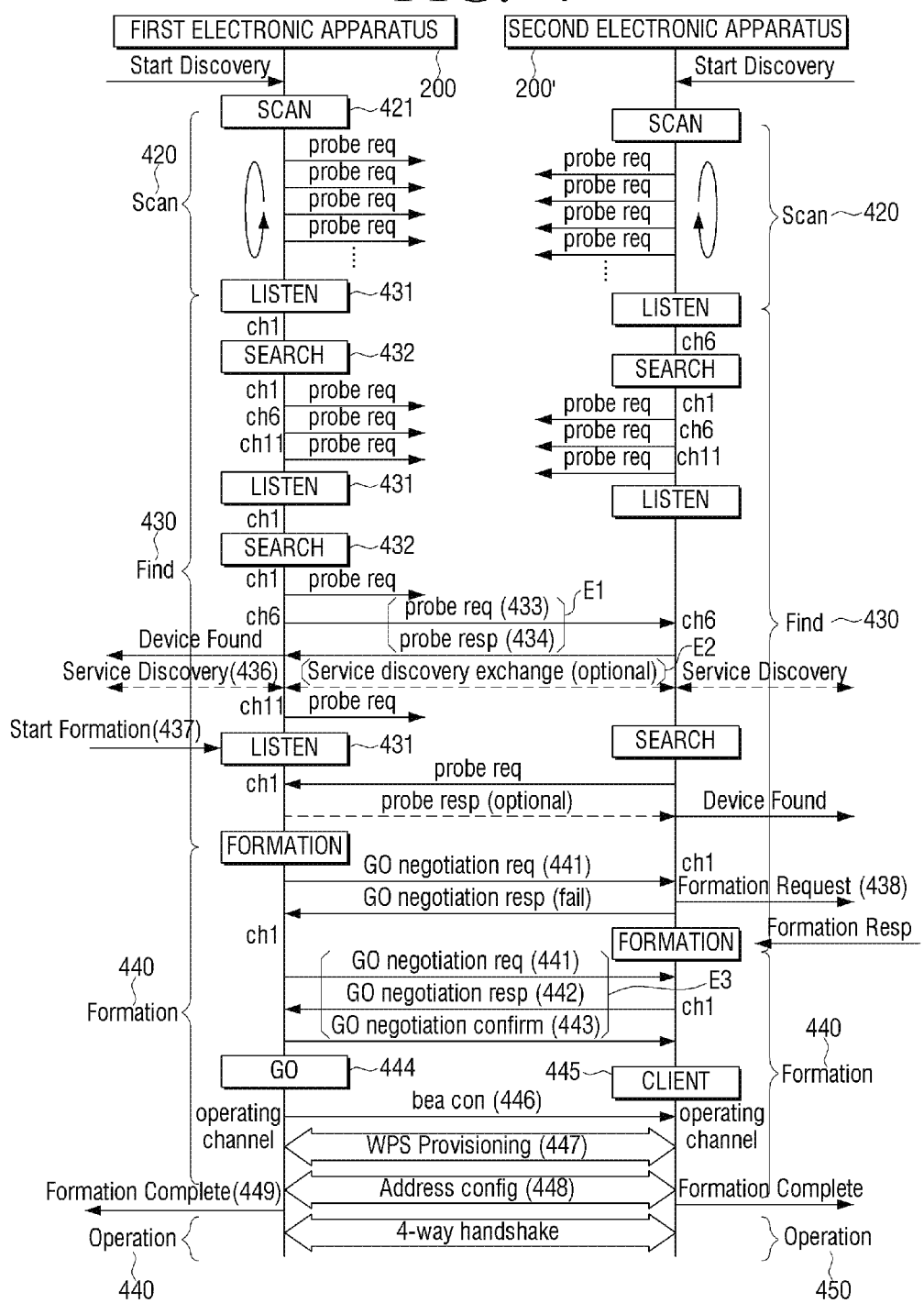
FIG. 4 is a sequence diagram for explanation of signaling while a group of Wi-Fi Direct is formed.

FIG. 4 is a sequence diagram for explanation of signaling while a group of Wi-Fi Direct is formed.

Referring to FIG. 4, a first electronic apparatus 200 and a second electronic apparatus 200' may initiate signaling for P2P communication. For description of the sequence of FIG. 4, the same or corresponding signals may be present and, thus, description will be given in terms of the first electronic apparatus 200 for convenience of description.

In response to a discovery start command 410 being received, the first electronic apparatus 200 may enter a scan state 421. As all channels of WiFi are sequentially converted in the scan state 421, the first electronic apparatus 200 may transmit a probe request signal and perform channel scan of searching for an operating channel or searching for an adjacent P2P group or P2P device (Scan phase: 420). The first electronic apparatus 200 that performs scan and the second electronic apparatus 200' may discover an adjacent electronic apparatus or P2P group or search for an optimum operating channel for formation of a P2P group.

A subsequent phase of the scan phase 420 may be a find phase 430 for discovery of an adjacent electronic apparatus. The find phase 430 includes a listen state 431 and a search state 432 that are periodically repeated.

The listen state 431 may be a state for opening any one of channels selected among social channels #1, #6, and #11 and receiving a probe request signal of another device, transmitted to the selected channel. In the example of FIG. 4, a listen channel of the first electronic apparatus 200 may be #1 and a listen channel of the second electronic apparatus 200' may be #6.

The search state 432 may transmit a probe request signal to each of all social channels #1, #6, and #11. In the embodiment of FIG. 4, when the first electronic apparatus 200 in the search state 432 transmits a probe request 433 to a channel #6 and, simultaneously, the second electronic apparatus 200' in a listen state in which channel #6 is opened receives the probe request 433, the second electronic apparatus 200' may transmit a probe response 434 to the first electronic apparatus 200 in response to the probe request 433. The first electronic apparatus 200 that receives the probe response 434 may discover the second electronic apparatus 200'. The first electronic apparatus 200 that receives the probe response 434 may output a signal 435 indicating the result.

Here, a probe request frame as content of a probe request signal may include peer to peer information element (P2P IE), P2P wildcard SSID element, wildcard BSSID and address information, and WiFi simple configuration information element (WSC IE).

In addition, the first electronic apparatus 200 and the second electronic apparatus 200' may exchange a signal for service discovery. In the service discovery procedure, queries for discovery of a service to be provided by a counterpart may be exchanged prior to formation of a P2P group. A user that checks a service 436 of a counterpart may determine whether group formation with the discovered counterpart is continuously performed or is stopped.

Here, the first electronic apparatus 200 may transmit a service discovery request signal to the second electronic apparatus 200' and the second electronic apparatus 200' that receives the service discovery request may transmit a service discovery response signal to the first electronic apparatus 200.

Then, in the example of FIG. 4, the first electronic apparatus 200 may be converted into a next listen state and the second electronic apparatus 200' may be converted into a next search state. The first electronic apparatus 200 that receives the probe request signal from the second electronic apparatus 200' in a search state may transmit a probe response to the second electronic apparatus 200' in response to the probe request signal but may immediately transmit a group owner (GO) negotiation request signal in a next phase.

The first electronic apparatus 200 that discovers an electronic apparatus may receive a signal 437 indicating initiation of group formation with the second electronic apparatus 200'.

The first electronic apparatus 200 may enter a formation phase 440.

The first electronic apparatus 200 converted into a formation state may transmit a GO negotiation request signal for determination of a group owner to the second electronic apparatus 200'. In the example of FIG. 4, the second electronic apparatus 200' may not be yet converted into a formation state. In this case, the second electronic apparatus 200' may output a formation request 438 for checking whether a group formation request of the first electronic apparatus 200 is permitted. The second electronic apparatus 200' that receives a response for permission of formation may be converted into a formation state.

The first electronic apparatus 200 that fails in a GO negotiation request may re-attempt a GO negotiation request 441. The second electronic apparatus 200' that receives the GO negotiation request 441 may transmit a GO negotiation response signal 442 to the first electronic apparatus 200. The first electronic apparatus 200 that receives the GO negotiation response signal 442 may transmit a GO negotiation confirm signal 443 to the second electronic apparatus 200'. According to such 3-way handshake, a group owner may be determined among the two electronic apparatuses 200 and 200'.

The GO negotiation request frame and the GO negotiation response frame that are exchanged between the first electronic apparatus 200 and the second electronic apparatus 200' may include P2P IE and WSC IE and, thereamong, the P2P IE may have the following information.

TABLE 1

| Attributes | Attribute ID |
| --- | --- |
| P2P Capability | 2 |
| Group Owner Intent | 4 |
| Configuration Timeout | 5 |
| Listen Channel | 6 |
| Extended Listen Timing | 8 |
| Intended P2P Interface Address | 9 |
| Channel List | 11 |
| P2P Device Information | 13 |
| Operation Channel | 17 |

The above P2P capability attributes represent features of a formed P2P group and group owner Intent attributes are as follows.

TABLE 2

| Field | Size(Octets) | Value |
| --- | --- | --- |
| Attribute ID | 1 | 4 |
| Length | 2 | 1 |
| GO Intent | 1 | variable |

Here, a GO Intent field may include information for determination of a group owner. The GO Intent field may have the following format.

TABLE 3

| Bit(s) | Information | Value |
| --- | --- | --- |
| 0 | Tie breaker | 0 or 1 |
| 1-7 | Intent | 0-15 |

The two electronic apparatuses 200 and 200' may compare Intent values of the GO Intent field to determine a device with a greater Intent value as a group owner. When Intent values of the GO Intent field are the same as the comparison result of Intent, randomly generated Tie breakers may be compared to determine a group owner.

The configuration timeout attributes refers to maximum time required to determine a group owner and to proceed to a WiFi provisioning phase.

The channel list attributes may include an Operating Class list and channel pair information. The channel list attributes has the following format.

TABLE 4

| Field | Size (Octets) | Value |
| --- | --- | --- |
| Attribute ID | 1 | 11 |
| Length | 2 | variable |
| Country String | 3 | Country code |
| Channel Entry List | variable | |

Here, the channel entry list field may include at least one channel entry and have the following format.

TABLE 5

| Field | Size (Octets) | Value |
| --- | --- | --- |
| Operating Class | 1 | Value for specifying driving class |
| Number of Channels | 1 | Number of channels |
| Channel List | variable | Octal variables, each octet states single channel number |

The two electronic apparatuses 200 and 200' that exchange information of the above channel list attributes may check available operable channels of the electronic apparatuses 200 and 200' and determine a common available channel.

The operating channel attributes may include an operating channel and operating class information. The operating channel attributes have the following format.

TABLE 6

| Field | Size (Octets) | Value |
| --- | --- | --- |
| Attribute ID | 1 | 17 |
| Length | 2 | 5 |
| Country String | 3 | Country code |
| Operating Class | 1 | |
| Channel Number | 1 | |

Here, a value of the operating class field may indicate a frequency band or a preferred driving frequency band when an electronic apparatus operates as a P2P group owner. In addition, a value of the channel number field may indicate a channel number or a preferred operating channel when an electronic apparatus operates as a P2P group owner.

As described above, during a conventional formation procedure of a P2P group, operating channel information exchanged between the two electronic apparatuses 200 and 200' may include only one channel number represented by octets. In addition, the reference and reason for selection of the channel number by a counterpart may not be known.

The first electronic apparatus 200 that receives the GO negotiation response signal 442 may transmit the GO negotiation confirm signal 443 to the second electronic apparatus 200'. The GO negotiation confirm frame may be as follows.

TABLE 7

| Attributes | Attribute ID |
| --- | --- |
| States | 0 |
| P2P Capability | 2 |
| Operating Channel | 17 |
| Channel List | 11 |
| P2P Group ID | 15 |

The above states attributes may indicate whether the above GO negotiation is successful or fails. In detail, when a group owner is determined among the first electronic apparatus 200 and the second electronic apparatus 200' via the above procedure, States may be set to a value indicating Success and when the group owner is not determined, the States may be set to a value indicating Fail.

In the example of FIG. 4, the first electronic apparatus 200 may propose GO intent greater than the second electronic apparatus 200' and may be a group owner.

In a phase after a group owner and a client are determined, the two electronic apparatuses 200 and 200' may perform WSC Provisioning. In this phase, authentication and association signaling (WPS Provisioning) 447 and address config 448 using a pre-input WPS PIN number may be performed.

Group formation complete may be output (449) and the first electronic apparatus 200 and the second electronic apparatus 200' may enter an operating phase 450 for performing 4-way handshake for data communication.

According to an exemplary embodiment of the present disclosure, in the above procedure, the first electronic apparatus 200 and the second electronic apparatus 200' may exchange the following preferred channel list prior to group formation.

TABLE 8

| Index | Channel | Weight | Reason |
| --- | --- | --- | --- |
| 1 | 11 | 5(○) | App required |
| 2 | 5 | 3(x) | Performance |
| 3 | 9 | 1(x) | Performance |
| ... | ... | ... | ... |

The preferred channel list of Table 8 above may include channel numbers of a plurality of preferred channels, weights assigned to respective channels, and reasons therefor. The plurality of channel numbers is aligned at a weight order and, accordingly, an index number indicates a priority sequence.

Weights for respective channels may be input to the weight field, and in the case of channel #11, a maximum weight 5 may be assigned. The maximum weight 5 may indicate Mandatory: ○ and the other weights that are not 5 may indicate Recommend: ×. According to another exemplary embodiment of the present disclosure, a field for writing whether a channel is the above mandatory or recommend channel may be further included in the preferred channel list.

Reason for assigning weights to respective channels may be input to the reason field. Reason information of a first index may indicate Channel #11 with a mandatory number assigned thereto is a channel that is mandatorily required for execution of an application. It may be seen that Channels #5 and #9 as other second and third channels are channels recommended for communication performance.

The preferred channel list may be included in a signal for existing Wi-Fi Direct connection. According to an exemplary embodiment of the present disclosure, in the find phase 430, the preferred channel list may be included in a probe request frame transmitted to an external apparatus from an electronic apparatus in the search state 432 and a probe response frame transmitted to an external apparatus from an electronic apparatus in the listen state 431, which receives the probe request (E1).

According to another exemplary embodiment of the present disclosure, in the find phase 430, the preferred channel list may be included in a service discovery request frame transmitted to an external apparatus from an electronic apparatus in the search state 432 and a service discovery response frame transmitted to an external apparatus from an electronic apparatus in the listen state 431, which receives a service discovery request (E2).

According to another exemplary embodiment of the present disclosure, in the formation phase 440, the preferred channel list may be included in a GO negotiation request frame transmitted to an external apparatus from an electronic apparatus and a GO negotiation response frame transmitted to an external apparatus from an electronic apparatus that receives a GO negotiation request signal (E3).

By virtue of signaling according to the above three embodiments (E1, E2, and E3), an electronic apparatus may exchange a preferred channel list using an existing frame without additional handshake.

According to another exemplary embodiment of the present disclosure, two electronic apparatuses may exchange a request signal including respective preferred channel lists and a response signal responding thereto in any phase before a group is formed and an operating channel is established. According to the present embodiment, an electronic apparatus may appropriately design appointed timing for transmission of a preferred channel list by an electronic apparatus for wireless P2P communication.

Figure 5:
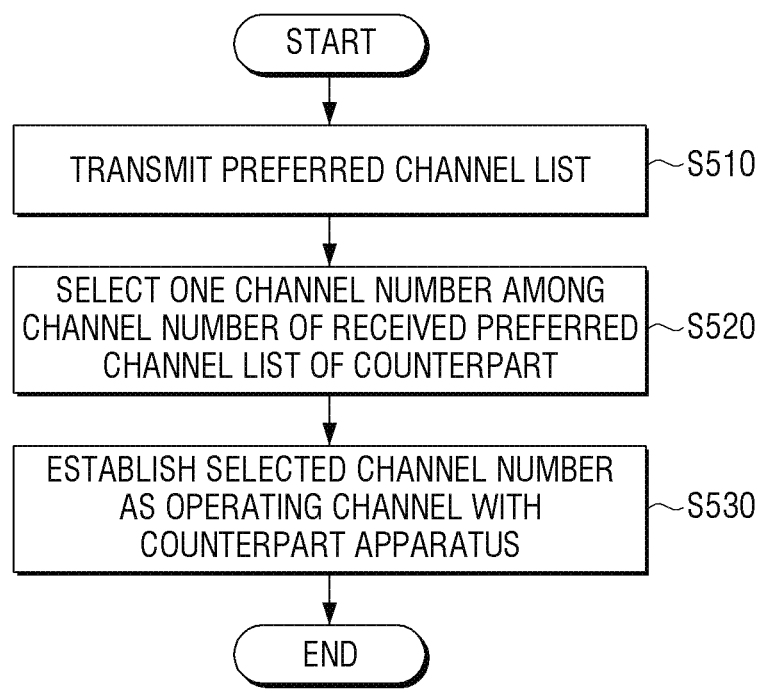
FIG. 5 is a flowchart for explanation of a communication method according to an exemplary embodiment of the present disclosure.

FIG. 5 is a flowchart for explanation of a communication method according to an exemplary embodiment of the present disclosure.

Referring to FIG. 5, the communication method may include transmitting a preferred channel list (S510). In detail, an electronic apparatus that supports wireless P2P communication, e.g., Wi-Fi Direct may transmit a preferred channel list including a preferred channel number indicating at least one pre-established channel among a plurality of channels available as operating channels to an external apparatus. Here, the electronic apparatus may transmit the preferred channel list in a probe request frame or a group owner negotiation request frame to an external apparatus. The preferred channel list generated in this phase may include a plurality of channel numbers and priority sequences or weights assigned to the respective channel numbers. According to another exemplary embodiment of the present disclosure, the preferred channel list may further include reason information for describing the reason for assigning priority sequences or weights to the respective channels.

Then, one channel number may be selected among channel numbers of the received counterpart preferred channel list (S520). In detail, in response to the counterpart preferred channel list being received from an external apparatus, an electronic apparatus may select one channel number among at least one channel number of a received second preferred channel list and a channel number included in the channel list of the electronic apparatus. Here, the electronic apparatus may read a priority sequence or weight corresponding to a channel number from the preferred channel list to select a channel of a common channel number with first priority or select a channel of a channel number with a maximum weight. When there is a channel number assigned a mandatory number, the electronic apparatus may select a mandatory channel and when connection with the mandatory channel is not capable of being established, the electronic apparatus fails in group formation. For example, the electronic apparatus may transmit a signal of a GO negotiation confirm frame, States of which are established as Fail, to an external apparatus. According to another exemplary embodiment of the present disclosure, when there is a plurality of channel numbers with the same priority sequence or the same weight, the electronic apparatus may select one channel with reference to the reason information.

Then, an operating channel with an external apparatus may be established using the selected channel number (S530). In detail, the electronic apparatus may form a P2P group using the operating channel with the external apparatus as a preferred channel selected in S520.

According to the aforementioned communication method according to an exemplary embodiment of the present disclosure, errors and inconvenience of P2P communication may be prevented and performance may be enhanced.

Figure 6:
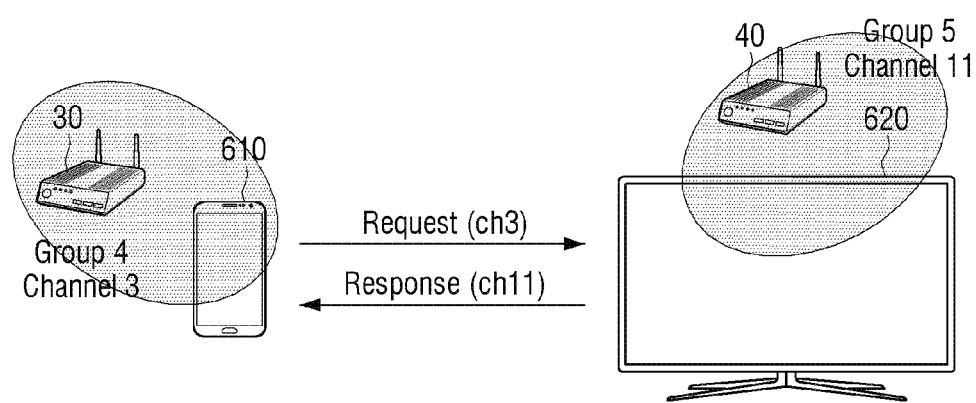
FIG. 6 is a diagram for explanation of weight assignment according to an exemplary embodiment of the present disclosure.

FIG. 6 is a diagram for explanation of weight assignment according to an exemplary embodiment of the present disclosure.

Referring to FIG. 6, a mobile phone 610 may set wireless LAN connection with a first AP 30 via Channel #3 and a television (TV) 620 may set wireless LAN connection with a second AP 40 via Channel #11.

The mobile phone 610 may attempt P2P connection with the TV 620. In detail, the mobile phone 610 may receive AV data streamed from an external server through the first AP 30 and output the received AV data as an image and sound.

The mobile phone 610 may have concurrency for setting only a single channel. In detail, a wireless communication module for Wi-Fi Direct communication of the mobile phone 610 may have capability of single channel concurrency (SCC) for setting only a single channel.

On the other hand, the mobile phone 610 may have concurrency for setting a plurality of channels. In detail, a wireless communication module of the mobile phone 610 may have capability of multi channel concurrency (MCC) for simultaneously setting different channels. Alternatively, the mobile phone 610 may include a plurality of wireless communication modules and have capability for connection different channels to the respective wireless communication modules.

A user of the mobile phone 610 may execute an output function to an external apparatus connected via Wi-Fi Direct. In detail, the mobile phone 610 may execute an application having a function of outputting AV data of multimedia that the user views and listens through the TV 620 using Wi-Fi Direct according to a user command.

The mobile phone 610 may activate a Wi-Fi Direct function in order to received AV data to the TV 620. In detail, the mobile phone 610 may perform operations of the scan, find, and formation phases for formation of a P2P group with the TV 620.

The mobile phone 610 may generate a first preferred channel list including Channel #3 that is pre-established with the first AP 30 and transmit a request signal including the first preferred channel list to the TV 620.

In response to the request signal including the first preferred channel list being received, the TV 620 may transmit a second preferred channel list including Channel #11 that is pre-established with the second AP 40 to the mobile phone 610 in response to the request signal.

The mobile phone 610 may assign a weight indicating that connection setting to Channel #3 is mandatory to Channel #3. In detail, the mobile phone 610 having the aforementioned capability needs to disconnect Channel #3 established with the first AP 30 and to establish the TV 620 with another channel when a channel of a group to be formed with the TV 620 is not Channel #3. Accordingly, the mobile phone 610 needs to maintain connection of Channel #3 with the first AP 30 in order to perform a function of an application for reproducing multimedia in the TV 620 via P2P connection with the TV 620.

The mobile phone 610 may transmit a preferred channel list including information indicating that selection of Channel #3 as an operating channel is mandatory to the TV 620 in order to maintain the established channel #3.

On the other hand, the mobile phone 610 having the aforementioned MCC capability may maintain a channel established with the first AP 30 even if a group to be formed with the TV 620 is not Channel #3. However, when Channel #3 is set as an operating channel with the TV 620, the mobile phone 610 may have higher communication performance than in a case in which another channel is set as the operating channel with the TV 620. That is, when a group with the TV 620 is formed via another channel, the mobile phone 610 may transmit a preferred channel list for recommendation of Channel #3 to the TV 620 in order to prevent performance from being degraded due to conversion into another channel from Channel #3.

The TV 620 that receives a request signal including a preferred channel list including Channel #3 may transmit a preferred channel list including Channel #11 established with the second AP 40 to the mobile phone 610. The TV 620 may transmit information indicating whether Channel #11 is mandatory or one of recommended candidates of an operating channel according to whether the TV 620 has SCC or MCC capability like the mobile phone 610.

According to the aforementioned embodiments of the present disclosure, a device may prevent streaming reproduction errors that are not expected by a user.

Figure 7:
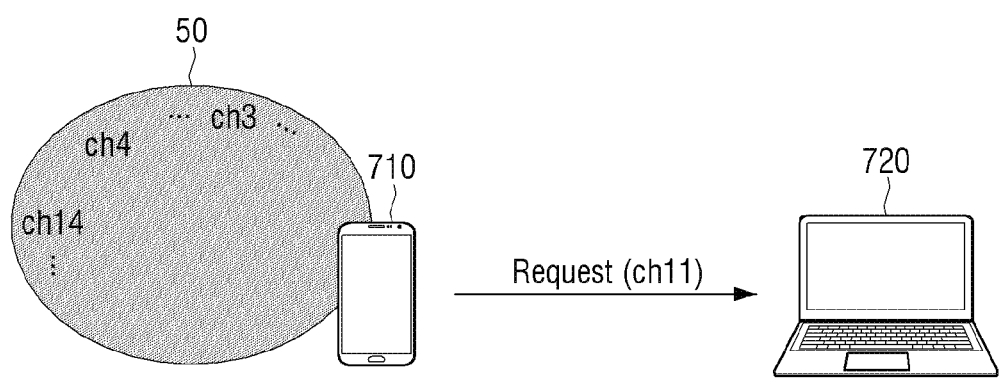
FIG. 7 is a diagram for explanation of weight assignment according to another exemplary embodiment of the present disclosure.

FIG. 7 is a diagram for explanation of weight assignment according to another exemplary embodiment of the present disclosure.

Referring to FIG. 7, a mobile phone 710 may transmit a request signal for formation of a P2P group with a laptop 720. A plurality of WiFi channels is present in surroundings 50 of the mobile phone 710.

The surroundings 50 of the mobile phone 710 may correspond to at least one group formed with the mobile phone 710. In detail, the mobile phone 710 may form at least one P2P group with one device or a plurality of devices.

A frequency of a radio signal spread around the mobile phone 710 may correspond to a frequency band of a specific channel. The mobile phone 710 may detect a present group via channel scan.

The mobile phone 710 may transmit a preferred channel list for recommendation of a channel number of a channel that is not present in the surroundings 50 to the laptop 720. In detail, the mobile phone 710 may transmit, to the laptop 720, the preferred channel list for excluding a channel with high interference due to high channel utilization and recommending setting of a channel, which is not used in surroundings, as an operating channel.

According to the aforementioned embodiments of the present disclosure, an electronic apparatus may provide Wi-Fi Direct with excellent quality.

Although all elements constituting the embodiments of the present disclosure are described as integrated into a single one or to be operated as a single one, the present disclosure is not necessarily limited to such embodiments. According to embodiments, all of the elements may be selectively integrated into one or more and be operated as one or more within the object and the scope of the present disclosure. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily understood by those skilled in the art to which the present disclosure pertains. The computer program may be stored in non-transitory computer readable media such that the computer program is read and executed by a computer to implement embodiments of the present disclosure.

The non-transitory computer readable medium is a medium that semi-permanently stores data and from which data is readable by a device, but not a medium that stores data for a short time, such as register, a cache, a memory, and the like. In detail, the aforementioned various applications or programs may be stored in the non-transitory computer readable medium, for example, a compact disc (CD), a digital versatile disc (DVD), a hard disc, a bluray disc, a universal serial bus (USB), a memory card, a read only memory (ROM), and the like, and may be provided.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An electronic apparatus for supporting wireless peer to peer (P2P) communication with an external apparatus, the electronic apparatus comprising:
    a communicator; and
    a controller configured to transmit a first preferred channel list comprising a channel number indicating at least one channel pre-established among a plurality of channels available as an operating channel and priority sequences assigned to the channels numbers based on communication quality of the pre-established channels through the communicator, to the external apparatus, to select a common channel number with the priority from at least one channel number included in a second preferred channel list and the channel number included in the first preferred channel list in response to the second preferred channel list being received from the external apparatus through the communicator, and to establish a selected channel number as an operating channel with the external apparatus.

2. The electronic apparatus as claimed in claim 1, wherein the controller transmits the first preferred channel list in a transmitted probe request frame to the external apparatus in a search state of a discovery phase.

3. The electronic apparatus as claimed in claim 1, wherein the controller transmits the first preferred channel list in a transmitted group owner (GO) negotiation request frame to the external apparatus in a group formation phase.

4. The electronic apparatus as claimed in claim 1, wherein:
  a plurality of channels are pre-established; and
  the controller transmits the first preferred channel list formed by assigning weights to channel numbers of the plurality of established channels to the external apparatus according to the communication quality of the plurality of established channels and whether a specific channel is required to execute a function of the electronic apparatus, and selects a channel with a maximum weight based on a first weight of the electronic apparatus, assigned to each channel number, and a second weight of the external apparatus among the at least one channel number included in the received second preferred channel list and the channel numbers included in the first preferred channel list.

5. The electronic apparatus as claimed in claim 4, wherein:
  the maximum weight comprises a mandatory number indicating that connection with a specific channel is mandatory; and
  the controller selects the channel to which the mandatory number is assigned when the mandatory number is present in the second preferred channel list received.

6. The electronic apparatus as claimed in claim 5, wherein the controller fails in group formation with the external apparatus when connection with the channel to which the mandatory number is assigned is not capable of being established.

7. The electronic apparatus as claimed in claim 5, wherein, when the electronic apparatus has concurrency for setting only a single channel and needs to maintain the single channel pre-established with a function to be executed for communication with the external apparatus, the controller assigns the mandatory number to the channel number indicating the established single channel.

8. The electronic apparatus as claimed in claim 1, wherein the controller assigns the priority sequence to the channel number based on whether one of a corresponding channel is the channel established with an AP and the number of other external apparatuses using the corresponding channel.

9. The electronic apparatus as claimed in claim 4, wherein:
  the controller transmits the preferred channel list further comprising reason information indicating a reason for assigning the weight to the plurality of channel numbers, to the external apparatus, and selects the channel with reference to the reason information included in the received second preferred channel list.

10. A communication method of an electronic apparatus for supporting wireless peer to peer (P2P) communication with an external apparatus, the method comprising:
  transmitting, to the external apparatus, a first preferred channel list comprising preferred channel numbers indicating one or more channels pre-established among a plurality of channels available as operating channels and priority sequences assigned to the channel numbers based on communication quality of the pre-established channels;
  in response to a second preferred channel list being received from the external apparatus, selecting a common channel number with first priority from the received second preferred channel list and the first preferred channel list; and
  establishing a channel of the selected channel number as an operating channel with the external apparatus.

11. The method as claimed in claim 10, wherein the transmitting comprises transmitting the first preferred channel list in a transmitted probe request frame to the external apparatus in a search state of a discovery phase.

12. The method as claimed in claim 10, wherein the transmitting comprises transmitting the first preferred channel list in a transmitted group owner (GO) negotiation request frame to the external apparatus in a group formation phase.

13. The method as claimed in claim 10, wherein:
  the plurality of channels are pre-established;
  the transmitting comprises transmitting the first preferred channel list formed by assigning weights to channel numbers of the plurality of established channels to the external apparatus according to the communication quality of the plurality of established channels and whether a specific channel is required to execute a function of the electronic apparatus; and
  the selecting comprises selecting a channel with a maximum weight based on a first weight of the electronic apparatus, assigned to each channel number, and a second weight of the external apparatus among the at least one channel number included in the received second preferred channel list and the channel numbers included in the first preferred channel list.

14. The method as claimed in claim 13, wherein:
  the maximum weight comprises a mandatory number indicating that connection with a specific channel is mandatory; and
  the selecting comprises selecting the channel to which the mandatory number is assigned when the mandatory number is present in the second preferred channel list received.

15. The method as claimed in claim 14, wherein the establishing comprises failing in group formation with the external apparatus when connection with the channel to which the mandatory number is assigned is not capable of being established.

16. The method as claimed in claim 14, wherein, when the electronic apparatus has concurrency for setting only a single channel and needs to maintain the single channel pre-established with a function to be executed for communication with the external apparatus, the mandatory number is assigned to the channel number indicating the established single channel.

17. The method according to claim 1, wherein the priority sequence is assigned to the channel number based on whether a corresponding channel is the channel established with one of an AP and the number of other external apparatuses using the corresponding channel.

18. The method according to claim 13, wherein:
the transmitting comprises transmitting the preferred channel list further comprising reason information indicating a reason for assigning the weight to the plurality of channel numbers, to the external apparatus; and
the selecting comprises selecting the channel with reference to the reason information included in the received second preferred channel list.

* * * * *